(12) United States Patent
Yamamoto et al.

(10) Patent No.: US 7,988,304 B2
(45) Date of Patent: Aug. 2, 2011

(54) VIDEO PROJECTOR

(75) Inventors: Kazuhisa Yamamoto, Osaka (JP);
Kiminori Mizuuchi, Osaka (JP);
Ken'ichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 602 days.

(21) Appl. No.: 10/590,715

(22) PCT Filed: Feb. 25, 2005

(86) PCT No.: PCT/JP2005/003167
§ 371 (c)(1),
(2), (4) Date: Aug. 25, 2006

(87) PCT Pub. No.: WO2005/083507
PCT Pub. Date: Sep. 9, 2005

(65) Prior Publication Data
US 2007/0120983 A1 May 31, 2007

(30) Foreign Application Priority Data

Feb. 27, 2004 (JP) ................................. 2004-054091

(51) Int. Cl.
*G03B 21/14* (2006.01)
*G03B 21/26* (2006.01)
*H04N 3/23* (2006.01)
(52) U.S. Cl. .............................. 353/69; 353/94; 348/746
(58) Field of Classification Search ..................... 353/30, 353/31, 69, 70, 84, 98, 99, 94; 348/746, 348/806, 747; 359/204.3, 204.2, 204.1; 396/42, 396/625
See application file for complete search history.

(56) References Cited

U.S. PATENT DOCUMENTS

| 5,479,236 | A  | * | 12/1995 | Tanaka ............................ 396/55 |
| 6,240,111 | B1 |   | 5/2001  | Kubota et al. |
| 6,330,398 | B1 | * | 12/2001 | Tanaka et al. ................... 396/53 |
| 6,333,943 | B1 |   | 12/2001 | Yamamoto et al. |
| 6,670,603 | B2 | * | 12/2003 | Shimada et al. .............. 250/235 |

(Continued)

FOREIGN PATENT DOCUMENTS

JP          5-134315          5/1993
(Continued)

OTHER PUBLICATIONS

Machine translation in english; Kiyoaki, Projector and Image Projection System, JP 2002-328428 A.*

*Primary Examiner* — William C Dowling
*Assistant Examiner* — Ryan Howard
(74) *Attorney, Agent, or Firm* — Wenderoth, Lind & Ponack L.L.P.

(57) ABSTRACT

A video projector includes a laser projection unit that has linear-polarization short-wavelength laser light sources and emits laser lights from the laser light sources, a lens system that collects the laser lights from the laser projection unit, a liquid crystal cell that spatially modulates the collected laser lights, a camera shake correcting optical system that is capable of translating vertically and horizontally on a plane that is perpendicular to the optical axis of the laser projection unit, a prism that transmits the laser lights from the liquid crystal cell and branches the light reflected by the screen, and a camera device that can observe or capture the video image that is branched by the prism. The present invention provides a video projector that can prevent the camera shake and can be held in hands.

5 Claims, 9 Drawing Sheets

U.S. PATENT DOCUMENTS

| | | | |
|---|---|---|---|
| 6,846,081 B2 * | 1/2005 | Mochizuki et al. | 353/70 |
| 6,877,864 B1 * | 4/2005 | Tamura et al. | 353/70 |
| 6,914,918 B2 | 7/2005 | Yamamoto et al. | |
| 7,187,343 B2 * | 3/2007 | Pate | 345/1.2 |
| 2001/0050932 A1 * | 12/2001 | Sonoda et al. | 372/43 |
| 2002/0001322 A1 | 1/2002 | Yamamoto et al. | |
| 2003/0223049 A1 | 12/2003 | Ohara | |
| 2004/0095970 A1 | 5/2004 | Yamamoto et al. | |
| 2004/0095971 A1 | 5/2004 | Yamamoto et al. | |
| 2004/0095972 A1 | 5/2004 | Yamamoto et al. | |
| 2004/0095973 A1 | 5/2004 | Yamamoto et al. | |
| 2004/0105469 A1 | 6/2004 | Yamamoto et al. | |
| 2005/0099607 A1 * | 5/2005 | Yokote et al. | 353/43 |
| 2006/0072912 A1 | 4/2006 | Momochi et al. | |

FOREIGN PATENT DOCUMENTS

| | | |
|---|---|---|
| JP | 6-265952 | 9/1994 |
| JP | 10-142689 | 5/1998 |
| JP | 11-264963 | 9/1999 |
| JP | 2001-194584 | 7/2001 |
| JP | 2001-311974 | 11/2001 |
| JP | 2002-124724 | 4/2002 |
| JP | 2002-171428 | 6/2002 |
| JP | 2002-328428 | 11/2002 |
| JP | 2004-4284 | 1/2004 |
| JP | 2004-301939 | 10/2004 |
| WO | 96/38757 | 12/1996 |

* cited by examiner

PRIOR ART

VIDEO PROJECTOR

BACKGROUND OF THE INVENTION

1. Technical Field

The present invention relates to a video projector and, more particularly, to a video projector which is employed in the optical information field that utilizes a coherent light.

2. Background Art

A video projector which employs laser lights will be described as a prior art video projector (for example, Patent Document 1).

Figure 11:
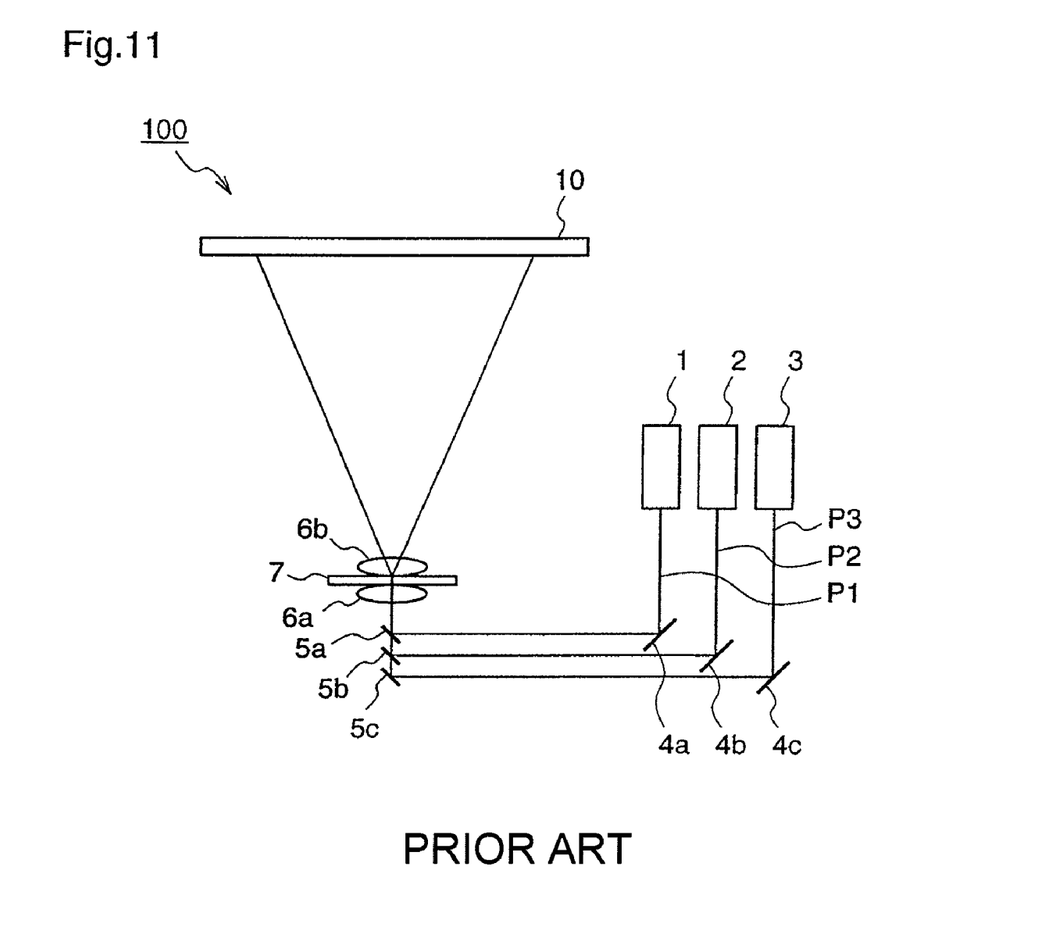
FIG. 11 is an entire block diagram illustrating a conventional video projector.

A block diagram of a conventional video projector will be shown in FIG. 11.

This video projector 100 has lasers 1, 2, and 3, as short-wavelength laser light sources, which emit three color laser lights P1, P2, and P3 of red, blue, and green, respectively. The video projector 100 further has mirrors 4a, 4b, 4c, 5a, 5b, and 5c, lens systems 6a and 6b, and a liquid crystal cell 7. Here, as red laser light source 1, a semiconductor laser is employed, as blue laser light source 2 and green laser light source 3, those which are obtained by the outputs of the semiconductor lasers being subjected to the wavelength conversion are employed. Further, a screen 10 employed in this video projector 100 is a screen of gain 1 that is usually used in a normal projector utilizing a mercury lamp, the size thereof is 90 inches.

Next, the operation will be described.

In the so-constructed video projector, the three-color (red, blue and green) laser lights P1 to P3 that are emitted from the short-wavelength laser light sources 1 to 3, respectively, are applied to the screen 10 through the liquid crystal cell 7.

More specifically, the red laser 1 exercises a continuous light emitting operation, and the laser light P1 emitted from the laser 1 is reflected by the mirrors 4a and 5a to change their destination. The laser light P1 reflected by the mirror 5a is projected by the lens system 6a onto the liquid crystal cell 7 and is modulated according to a video signal thereat. The laser light P1 modulated by the liquid crystal cell 7 is enlarged by the lens system 6b and is projected onto the screen 10. The laser lights P2 and P3 that are emitted from the blue laser 2 and the green laser 3 are respectively reflected by the mirrors 4b and 4c, and are further respectively reflected by the mirrors 5b and 5c so that their optical axes are aligned with that of the laser light P1 emitted from the red laser 1, and are projected by the lens system 6a onto the liquid crystal cell 7. The laser lights P2 and P3 projected onto the liquid crystal cell 7 are respectively modulated at the liquid crystal cell 7 according to a video signal, and the modulated laser lights P2 and P3 are enlarged by the lens system 6b to be projected onto the screen 10.

The modulation to the respective three-color laser lights P1 to P3 by the liquid crystal cell 7 is performed by time-sharing for each color.

A person can see the video projected on the screen 10, by observing light that is reflected or scattered by the screen 10 from the front face of the screen, i.e., from the side of projecting laser.

When this video projector 100 projects full white, the screen 10 has brightness of approximately 200 lux.
Patent Document 1: Pamphlet of International Publication No. 96/03875

However, the above-mentioned conventional video projector may occur a camera shake when a person intends to perform projection with holding the same in his or her hands. For example, usually, a person subtly jiggles-his or her hands at a frequency of several Hz. The influences on the projected images by this camera shake becomes hard to be avoided when the distance from the video projector to the screen becomes larger and the enlarging ratio becomes higher, and thereby on the projected video becomes difficult to be seen.

In addition, the conventional projector has a consumption power of 200 W or more, and the body of the projector becomes too hot to be held in one's hands due to heat generated by the light source.

The present invention is directed to solving the above-mentioned problems, and has for its object to provide a video projector which can avoid the projected video from being disturbed due to the camera shake when projecting a video with holding the same in one's hands.

SUMMARY OF THE INVENTION

In order to solve the above-mentioned problems, there is provided a video projector for projecting video, which comprises: a camera shake detection unit that detects an amount of camera shake of the video projector; and a camera shake correction unit that corrects the camera shake according to the detected amount of camera shake.

Therefore, it is possible to prevent the projected images from being distorted due to the camera shake when projecting video with holding the video projector in one's hands. For example, even when riding on a vehicle, the projected images are stable as if the projector is set on a tripod, and it is possible to capture up to fine texture of skin. Naturally, it is also possible to prevent flickering of images at the video projection, and thereby greatly reduce visual fatigue due to the flickering images to a great extent.

The video projector further comprises: short-wavelength laser light sources which emit laser lights of at least three colors of red, blue and green; and the camera shake correction unit performs correction of the camera shake so that the projecting positions of the laser lights of three colors of red, blue and green are not deviated when the video is projected.

Therefore, since the short-wavelength laser light sources are employed, the light emission efficiency and the transmission efficiency are high, and it is possible to greatly reduce power consumption as well as suppress generation of heat. In addition, since the short-wavelength laser light sources emit monochromatic light and there is no aberration, it is easily possible to correct the camera shake as well as enhance accuracy in the camera shake correction. A video image is formed by scanning of the three-color laser lights on a projection region.

Therefore, since a two-dimensional image device such as a liquid crystal cell is not required, it is advantageous in miniaturization and light-weighting, and it is possible to further miniaturize the device by employing, for example, an MEMS.

At least one of the short-wavelength laser light sources comprises: an infrared semiconductor laser which emits infrared laser light; and a wavelength conversion element which makes the infrared laser light emitted from the infrared semiconductor laser subjected to wavelength conversion to output the converted laser light, and a part of the light which is not subjected to wavelength conversion, among the infrared laser light that is emitted from the infrared semiconductor laser being outputted to the external space.

Therefore, it is possible to greatly reduce a temperature rise inside the device, thereby realizing a handheld video projector that is easier to handle.

The video projector further comprises: a camera device, and the projection position of the laser light being detected by the camera device when the laser light from the short wavelength laser light source is projected.

Therefore, it is possible to detect the camera shake that is occurred by the camera device, and it is not required to provide a mechanism for detecting the camera shake.

According to an embodiment of the present invention, a projecting optical system which projects video takes the focus of the projected video by an auto-focusing function.

Therefore, it is possible to automatically take the focus of the projected video on the screen, and to display a clear image immediately after the projection. The projecting optical system which projects video performs correction of the projected video in a trapezoidal shape when performing the projection of video.

Therefore, it is possible to prevent the projected video from being distorted in a trapezoidal shape when the video is projected from an angle with respect to the projection-plane. In addition, when the projected image is captured by the camera device, it is possible to capture an image that is more natural.

According to an embodiment of the present invention, the video projector further comprises: a camera device; the infrared laser light being irradiated to a region outside the projection region; the infrared laser light from the region outside the projection region being detected.

Therefore, it is possible to correctly detect, even when the screen face is white and there is no mark serving as a remarque on the screen, the projection position on the basis of a video image that has captured in a region outside the screen, thereby improving accuracy in the camera shake correction.

A portion serving as a remarque on the projection region is detected by the camera device when projecting video.

Therefore, it is possible to correctly detect the projection position, thereby improving accuracy in the camera shake correction. The projection optical system which projects video has a prism having polarization, which is disposed on the optical axis of the projection optical system.

Therefore, by projecting linear-polarized lights as the laser lights to be projected, it is possible to prevent loss in the light amount arising in the prism when projecting video, and thereby making the video projector available even in a dark place.

According to an embodiment of the present invention, there is provided a video projector for performing video projection, comprises: a projection optical system which includes a short-wavelength laser light source and projects laser light which is emitted from the short-wavelength laser light source; and a camera device which captures external light through the projection optical system.

Therefore, it is possible to greatly reduce a temperature rise inside the device, and thereby realizing a handheld video projector that is easier to handle. Further, it is possible to perform both of projection and capturing of video simultaneously or in time-sharing. The projection optical system takes the focus of projected video by an auto-focusing function.

Therefore, it is possible to automatically take the focus of the projected video on the screen, and display a clear image immediately after the projection. The projection optical system performs correction of the projected video in a trapezoid shape when performing the projection of video.

Therefore, it is possible to prevent the projected video from being distorted in a trapezoidal shape when the video is projected from an angle with respect to the projection plane. In addition, when the projected image is captured by the camera device, it is possible to capture an image that is more natural. The projecting optical system has a prism having polarization, which is disposed on the optical axis of the projection optical system.

Therefore, by projecting linear-polarized lights as laser lights to be projected, it is possible to prevent loss in the light amount occurring in the prism when projecting video, and thereby making the video projector available even in a dark place.

The short-wavelength laser light sources comprises: an infrared semiconductor laser which emits infrared laser light; and a wavelength conversion element which makes the infrared laser light emitted from the infrared semiconductor laser subjected to wavelength conversion to output the converted laser light, and a part of the light which is not subjected to wavelength conversion, among the infrared laser light that is emitted from the infrared semiconductor laser being outputted to the external space.

Therefore, it is possible to greatly reduce a temperature rise inside the device, and thereby realizing a handheld video projector that is easier to handle.

According to the present invention, it is possible to realize a video projector that is portable and can project video with holding the device in one's hands. Further, when projecting video with holding the device in one's hands, the video projector can prevent the projected images from being distorted due to the camera shake, and its industrial value is extremely high.

That is, the video projector according to the present invention is innovative because it can quickly correct the camera shake by that the optical path of the optical system is changed in accordance with vibrations due to the camera shake by an optical correcting system. For example, even at a place that is not stable such as in a vehicle, it is possible to prevent distortion of the projected image to provide a stable image thereof as if the video projector is set on a tripod, and thereby capturing even fine texture of skin. It is, of course, possible to greatly reduce visual fatigue due to flickering of images.

Further, the video projector according to the present invention can perform both of projection and capturing of video by providing a camera device, and further it is possible to increase uses of the projector, which leads to a new world such as games and the like by performing the projection and capturing of video simultaneously or in time-sharing.

Further, since the video projector according to the present invention employs the short-wavelength laser light sources as the laser light sources, it has higher luminous efficiency and transmission efficiency, and thus the power consumption is greatly reduced and heat generation is also suppressed. Therefore, it is possible to realize a handheld video projector.

Further, since in the video projector according to the present invention, linear-polarized short-wavelength laser light sources are employed as light sources, and a prism having a polarization is employed as the prism that is to be located on the optical path of the light source lights, it is possible to utilize the amount of light from the light sources with no loss at all, when projecting video.

BRIEF DESCRIPTION OF THE DRAWINGS

FIG. 3 are diagrams for explaining camera shake correction according to the first embodiment, FIG. 3(a) illustrating a state where the optical axis of the laser projection unit is located in the center of the screen, FIG. 3(b) showing an operation of the camera shake correcting optical system when the optical axis of the laser projection unit is deviated upward on the screen, and FIG. 3(c) showing an operation of the camera shake correcting optical system when the optical axis of the laser projection unit is deviated downward on the screen.

FIG. 6 are diagrams for explaining camera shake correction according to the second embodiment, FIG. 6(a) illustrating a state where the optical axis of the laser projection unit is located in the center of the screen, FIG. 6(b) showing an operation of the camera shake correcting optical system when the optical axis of the laser projection unit is deviated upward on the screen, and FIG. 6(c) showing an operation of the camera shake correcting optical system when the optical axis of the laser projection unit is deviated downward on the screen.

FIG. 8 are schematic diagrams for explaining principles of a video projector according to a third embodiment of the present invention, FIG. 8(a) showing a video projecting state and FIG. 8(b) showing a video capturing state.

DESCRIPTION OF THE NUMERALS

1 . . . red laser
2 . . . blue laser
3 . . . green laser
4a, 4b, 4c, 5a, 5b, 5c, 5d, 5e . . . mirror
6a, 6b . . . lens system
7 . . . liquid crystal cell
10, 10a . . . screen
13 . . . absorber film
14 . . . vertical deflection unit
15 . . . horizontal deflection unit
22 . . . shutter
23 . . . CCD
24, 24a, 24b, 24c, 24d . . . prism
25a, 25b, 25c, 25d . . . wavelength filter
26 . . . mirror
27a, 27b, 27c, 27d . . . photodetector
28a, 28b, 28c, 28d . . . modulator
50 . . . laser projection unit
60 . . . camera device
70, 80 . . . camera shake detecting mechanism
90, 90a . . . image formation unit
101, 102, 103, 104, 104a . . . video projector
110, 120, 140 . . . camera shake correcting optical system
110a, 110b, 120a . . . optical system driving mechanism
121, 122, 141, 142 . . . glass plate
123, 143 . . . bellows
124, 144 . . . high refraction liquid
133, 134, 141a, 142 . . . supporting rod
125, 145 . . . supporting member
131, 132, 146 . . . electromagnetic actuator P . . . laser light
P0 . . . infrared laser light
P1 . . . red laser light
P2 . . . blue laser light
P3 . . . green laser light

DETAILED DESCRIPTION OF THE INVENTION

Hereinafter, embodiments of the present invention will be described in detail, with reference to the drawings.

Embodiment 1

Figure 1:
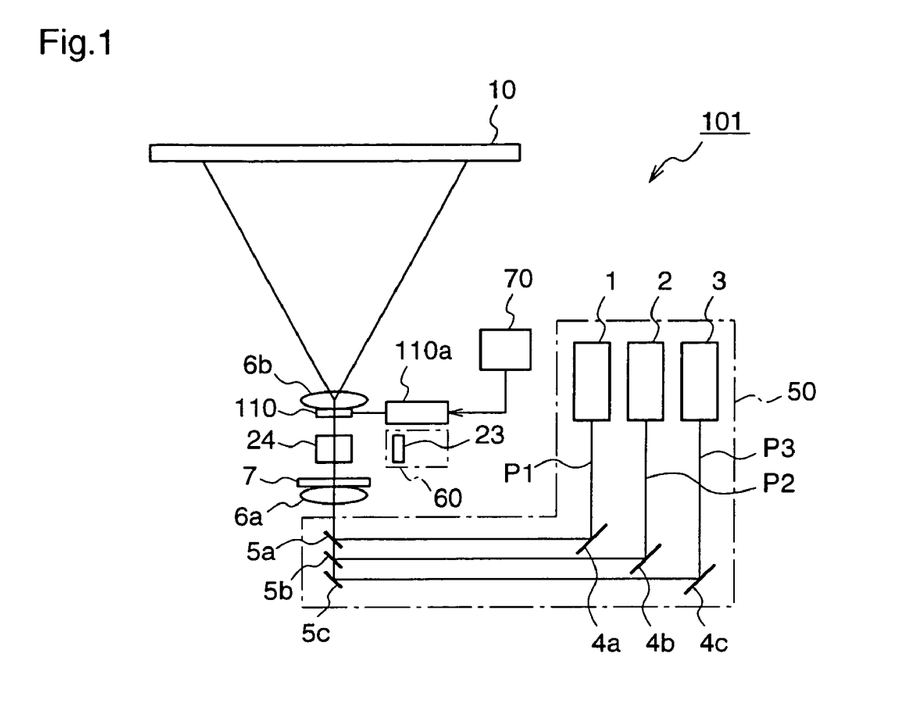
FIG. 1 is an entire block diagram illustrating a video projector according to a first embodiment of the present invention.

A block diagram of a laser projector, which is a video projector according to a first embodiment of the present invention, is shown in FIG. 1. Here, an example in which laser lights are projected on the front surface of a screen, and we observe video also from the front surface of the screen will be described.

The laser projector according to this embodiment (hereinafter, referred to as a video projector) 101 has linear-polarized lasers 1, 2 and 3, as three-color (i.e., red, blue and green) short-wavelength laser light sources, and employs a screen that reflects three-color (red, blue and green) laser lights P1, P2 and P3 that are emitted from the lasers, as a screen 10 onto which video is projected. The video projector 101 further has mirrors 4a, 4b, 4c, 5a, 5b and 5c, lens systems 6a and 6b, and a liquid crystal cell 7. The lasers 1, 2 and 3 and the mirrors 4a, 4b, 4c, 5a, 5b and 5c constitutes a laser projection unit 50 that emits the three-color laser lights for video projection of the video projector 101.

The lens system 6b includes projection lens, and the lens system 6a includes field lens. The respective wavelengths of the laser lights are 465 nm (blue), 532 nm (green), and 635 nm (red). A 635 nm red semiconductor laser is employed as the red laser 1, and short-wavelength laser light sources that has converted the wavelength of semiconductor lasers, i.e., one that is composed of an infrared semiconductor laser and a wavelength conversion element which performs wavelength conversion to output light from the infrared semiconductor laser, are employed as the blue laser 2 and the green laser 3, respectively. An MgO-doped LiNbO$_3$ substrate is employed as the wavelength conversion element.

Since the lasers 2 and 3 for the blue light and green light perform the wavelength conversion in the same manner, the laser 3 for the green light will be briefly described. In this case, an infrared semiconductor laser with the wavelength of 1060 nm and the optical output of 500 mW is employed. In the green light laser utilizing the wavelength conversion, output light from the infrared semiconductor laser with the optical output of 500 mW is subjected to the wavelength conversion by the wavelength conversion element, then a green light of 100 mW (wavelength of 530 nm) is taken out from the wavelength-converted light, and light less than 400 mW in the infrared light, which has not been converted, is radiated to the air. Further, when the light that has not been converted by the wavelength conversion element, which is emitted to outside, is scattered by using a scattering body or the like, it is possible to realize a video projector that can safely perform external radiation of unwanted laser lights.

The video projector 101 according to the first embodiment has a camera shake correcting optical system 110 that is located on the light path of the laser lights P1, P2 and P3, a camera shake detecting mechanism (camera shake detecting unit) 70 that has two vibration gyros (not shown) and detects an amount of the camera shake, an optical system driving mechanism 110a that drives the camera shake correcting optical system 110 according to the amount of the camera shake, which constitutes a camera shake correcting unit together with the camera shake correcting optical system 110, a camera device 60 using a CCD 23, and a prism 24 that is located on the optical path of the laser lights P1, P2 and P3. The prism 24 has a polarization, and transmits linear-polarized laser lights from the laser light sources, without reflecting the same, but reflects part of light that is taken in from outside the device through the lens 6b and the camera shake correcting optical system 110, to the CCD 23. In this first embodiment, the laser projection unit 50, the lens systems 6a and 6b, the liquid crystal cell 7, the camera shake correcting optical system 110, and the prism 24 constitute a projection optical system that projects laser lights.

Next, the operation will be described.

When the laser lights P1, P2 and P3 on which video information is superimposed are projected from the so-constructed video projector 101 onto the screen 10, video images are formed on the screen 10.

In this first embodiment, as camera shake correction is performed by the camera shake correcting optical system 110, the camera shake hardly affects the video images on the screen 10. Further, since the laser lights reflected on the screen are branched by the prism 24 to the CCD 23, it is possible to observe or capture the video images on the screen 10.

Figure 2:
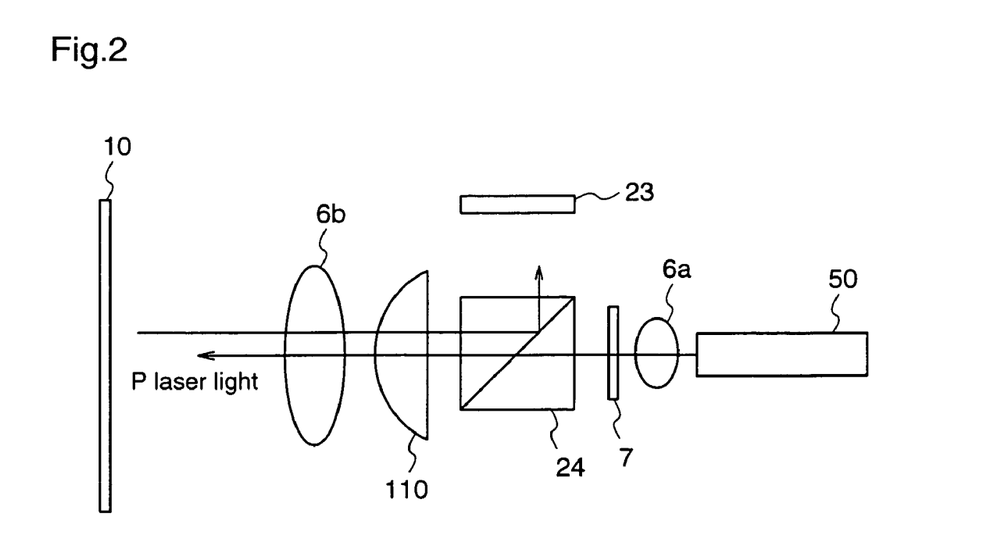
FIG. 2 is a schematic diagram for explaining principles of the video projector according to the first embodiment.

Next, the scheme of the camera shake correction by the video projector 101 according to the first embodiment will be described, with reference to FIG. 2. In FIG. 2, the same components as in FIG. 1 are denoted by the same reference numerals.

Camera shake occurs due to subtle vibrations of the video projector 101 that is held in hands. When the video projector 101 moves the camera shake correcting optical system 110 according to the amount of the camera shake, the image that is projected on the screen 10 will not move.

In this first embodiment, the camera shake correcting optical system 110 is a convex lens. The camera shake correcting optical system 110 is not limited to the convex lens, but can be anything if it has a function of changing the traveling direction of light passing through the optical system, through its movement or the like, and may be a concave lens, for example. Further, the shape of the optical system is not limited to the lens shape, but the optical system may be of a flat plate shape as long as it has a refractive-index distribution.

The camera shake correction using the camera shake correcting optical system 110 will be specifically described, with reference to FIG. 3.

Figure 3A:
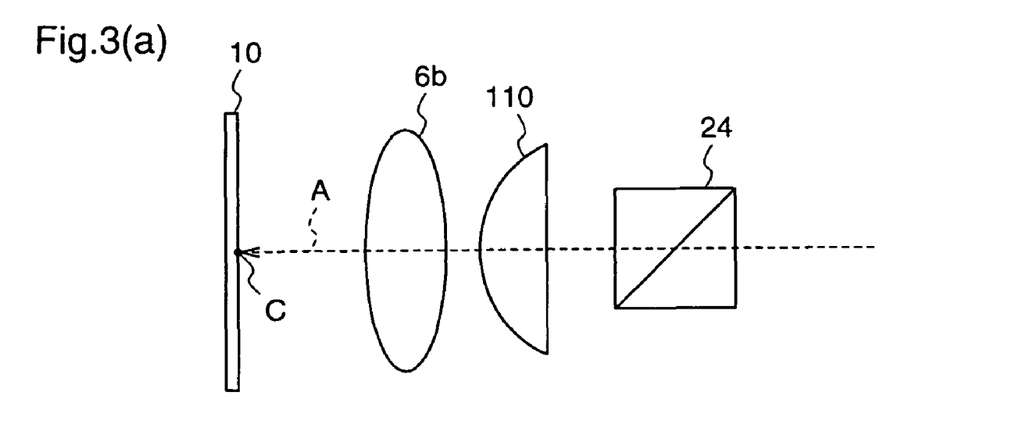

FIG. 3(a) shows a state where the optical axis A of the laser projection unit 50 of the video projector 101 is aligned with the center C of the screen 10.

Figure 3B:
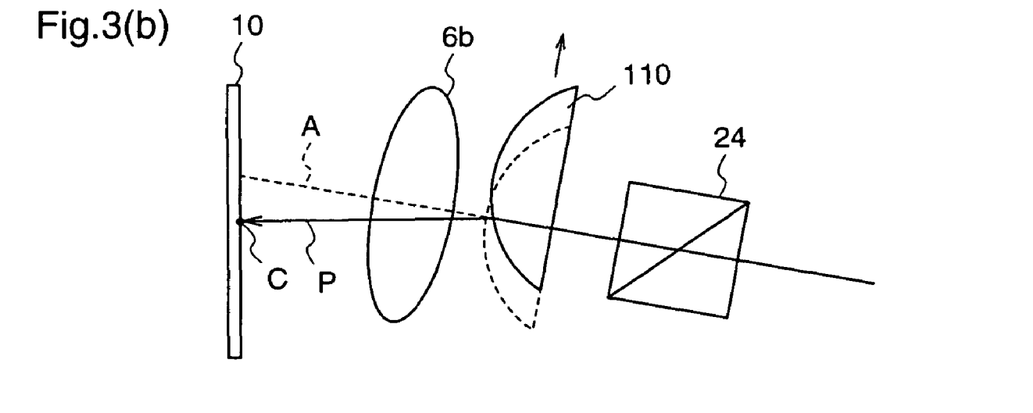
Figure 3C:
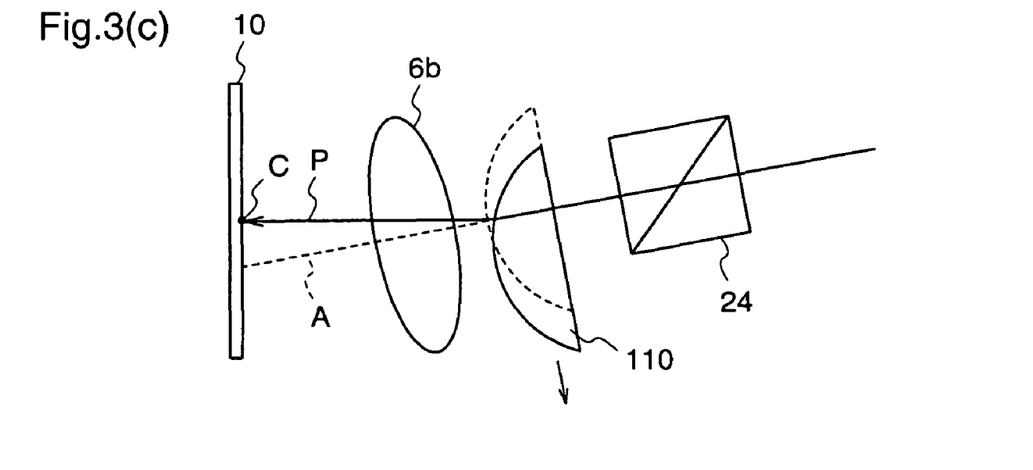

When the optical axis A of the laser projection unit 50 is deviated upward with respect to the center of the screen 10 due to the camera shake as shown in FIG. 3(b), a convex lens as the camera shake correcting optical system 110 is translated upward in a plane that is perpendicular to the optical axis A. Accordingly, the laser light P from the laser projection unit 50 is refracted by the camera shake correcting optical system 110, thereby it is possible to correct deviation of the video projecting position due to the camera shake, i.e., deviation of the center of the projected image from the center C of the screen 10. When the optical axis A of the laser projection unit 50 is deviated downward with respect to the center C of the screen 10 due to the camera shake as shown in FIG. 3(c), the convex lens as the camera shake correcting optical system 110 is translated downward in a plane that is perpendicular to the optical axis A. Accordingly, the laser light P from the laser projection unit 50 is refracted by the camera shake correcting optical system 110, thereby it is possible to correct deviation of the video projecting position due to the camera shake. Since practically the camera shake occurs in both of the vertical and horizontal directions, the camera shake correcting optical system 110 is translated vertically and horizontally in a plane that is perpendicular to the optical axis A, so as to correct the deviation of the video projecting position due to the camera shake.

In this first embodiment, two vibration gyros, i.e., a vibration gyro for detecting vertical shake and a vibration gyro for detecting horizontal shake are employed as the camera shake detecting mechanism 70 that detects the camera shake.

When having detected the camera shake, the camera shake detecting mechanism 70 outputs a signal indicating an amount of the camera shake to the optical system driving mechanism 110a. Then, the optical system driving mechanism 110a translates the camera shake correcting optical system 110 in a plane that is perpendicular to the optical axis A of the laser projection unit 50, according to the detected amount of the camera shake. Accordingly, the laser light from the laser projection unit 50 is refracted in a direction in which deviation of the optical axis of the laser projection unit 50 due to the camera shake is cancelled, whereby the camera shake of the projected video is corrected.

A response time from the detection of the camera shake to the translation of the camera shake correcting optical system 110 was only 1/200 sec. Since the effect of the camera shake correction is much faster than a speed of a frame period at which a person appears to be continuously moving, i.e., a speed of 60 frames per second of video being switched, the influences of the camera shake were completely eliminated. The camera shake correction is a function that always works while video is projected on the screen 10.

Next, projection and capturing by the video projector which includes a camera device according to the present invention will be described.

As the above-described camera shake correcting mechanism by an optical shifting method, which translates the camera shake correcting optical system, can perform the camera shake correction at a high speed and a high accuracy, the camera device of this video projector can be adopted as a video camera. This video projector also can provide a high performance also in a video processing field that handles moving images, by switching between projection and capturing of video images.

Next, the operation of the laser projection unit will be described.

The projection of the laser lights is performed in the same manner as in the prior art.

Briefly, the laser light P1 that is emitted from the laser 1 is reflected by the mirrors 4a and 5a, and projected onto the liquid crystal cell 7 by the lens system 6a. The laser lights P2 and P3 that are emitted from the blue laser 2 and the green laser 3 are reflected on the mirrors 4b and 4c, and further reflected on the mirrors 5b and 5c, respectively, so that their optical axes are aligned with that of the laser light P1 from the red laser 1, and are projected onto the liquid crystal cell 7 by the lens system 6a. The liquid crystal cell 7 modulates the laser lights P1 to P3 of three colors in a time-sharing for each color. Then, the modulated laser lights P1 to P3 are enlarged by the lens system 6b and projected on the screen 10, respectively.

A person can see video that is projected on the screen 10 in the above-described manner, by observing reflected light and scattered light from the screen 10 in beforehand the screen, i.e., from the side of projecting the laser.

In this embodiment, green light of 100 mW (wavelength of 530 nm) is taken out from the infrared semiconductor laser with the optical output of 500 mW, and the total power consumption is 5 W. Since the light less than 400 mW, which has not been converted among the infrared light, is radiated to the air, it does not contribute to a temperature rise inside the video projector, so that it is possible to keep the device temperature low. More specifically, non-converted infrared light in the usual video projector becomes stray light or is absorbed by an infrared cut filter, resulting in a temperature rise inside the device, while non-converted infrared light in the video projector according to the present invention is radiated to the air as described above, whereby it is possible to prevent a temperature rise inside the device, as is effective in a case where projection is performed with the video projector being held in hands.

As described above, by constructing the video projector so as to provide the green laser light of 100 mW, the blue laser light of 100 mW, and the red laser light of 150 mW by using the semiconductor laser, it is possible to realize stable lateral mode and power, and good color reproducibility, as well as provide good contrast video.

As the prism 24 has a polarization, 100% of linear-polarized laser lights will be passed through that. Therefore, the loss in the amount of light does not occur at all.

In this embodiment, a description is given of a case where the blue laser and the green laser each comprises a wavelength conversion element and an infrared semiconductor laser, respectively, and parts of the infrared laser lights from the infrared semiconductor lasers are radiated to the air. However, it is also possible to employ semiconductor lasers as the blue laser and the green laser.

Further, as the laser light sources, not only semiconductor lasers but also LED sources may be employed.

In this first embodiment, the video projector includes the laser projection unit 50 that emits the laser lights P1, P2 and P3, and the camera shake correcting optical system 110 comprising a convex lens, which is located on the optical axis A of the laser projection unit 50, and translates the convex lens as the camera shake correcting optical system 110 vertically and horizontally in a plane that is perpendicular to the optical axis A, so that deviation of the video projecting position due to the camera shake is corrected, thereby it is possible to almost eliminate the influences on the video on the screen 10 by the camera shake. Further, as the camera shake can be quickly corrected as described above, it is possible to avoid distortion of the projected images and provide stable images, even in a place that is not stable such as in a vehicle, as if the device is set on a tripod, thereby it is possible to capture fine textures of skin. Naturally, also visual fatigue due to flicker of images can be considerably reduced.

In this first embodiment, the video projector further includes the prism 24 for changing the optical path, and the CCD 23, whereby it is possible to realize the video projector that combines the function as a projector and the function as a video camera. Accordingly, it is possible to perform both projection and capturing of video, and by simultaneously performing projection and capturing of video or switching between projection and capturing, it is believed that the uses are increased and a new world such as games is opened. A compact device having the video projection function and video capturing function is available for a mobile phone and the like.

Because the short-wavelength laser light sources are employed as RGB generation light sources, the luminous efficiency and transmission efficiency is high, and thus the power consumption is greatly reduced. Accordingly, it is also possible to suppress heat generation, which is one of the reasons why this video projector is allowed to be held in hands.

In this first embodiment, while the case where the camera shake correction is performed by translating the camera shake correcting optical system is illustrated, when the camera shake correcting optical system is a tabular member that is composed of glass having a refractive index different from that of the air, the camera shake correction can be performed by tilting the camera shake correcting optical system.

Embodiment 2

Figure 4:
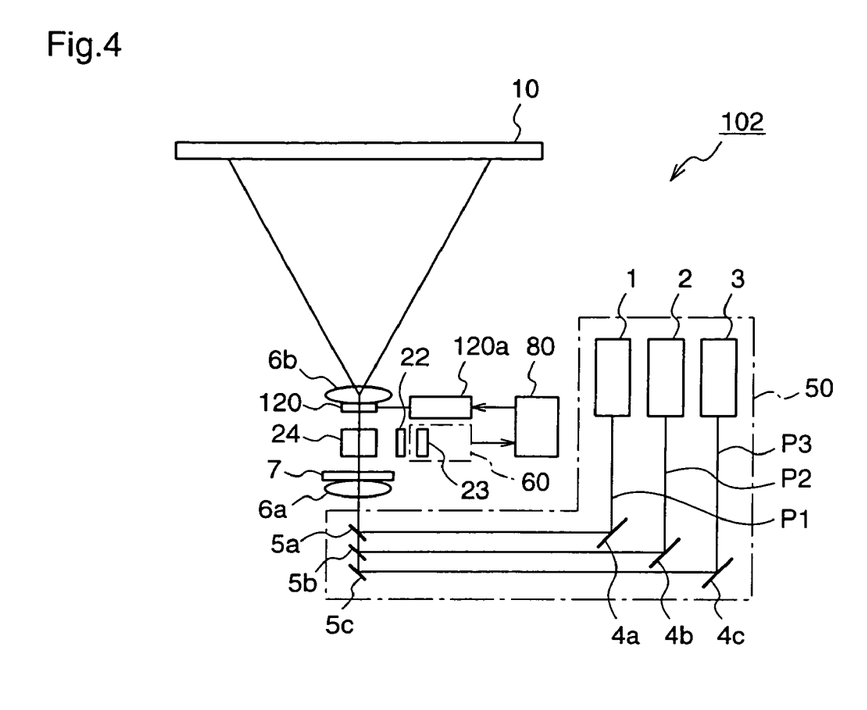
FIG. 4 is an entire block diagram illustrating a video projector according to a second embodiment of the present invention.

A block diagram of a video projector according to a second embodiment of the present invention is shown in FIG. 4.

A video projector 102 according to the second embodiment includes a laser projection unit 50, a liquid crystal panel 7, lens systems 6a and 6b, a prism 24, a camera shake correcting optical system 120, an optical system driving mechanism 120a, and a camera device 60, as in the first embodiment.

The video projector 102 according to the second embodiment further comprises a shutter 22 which is disposed in front of a CCD 23 that constitutes the camera device 60, and a camera shake detecting mechanism 80 which detects the camera shake on the basis of video captured by the camera device 60.

The laser projection unit 50, the liquid crystal panel 7, the lens systems 6a and 6b, the prism 24, and the camera device 60 are the same as those in the first embodiment.

Figure 5:
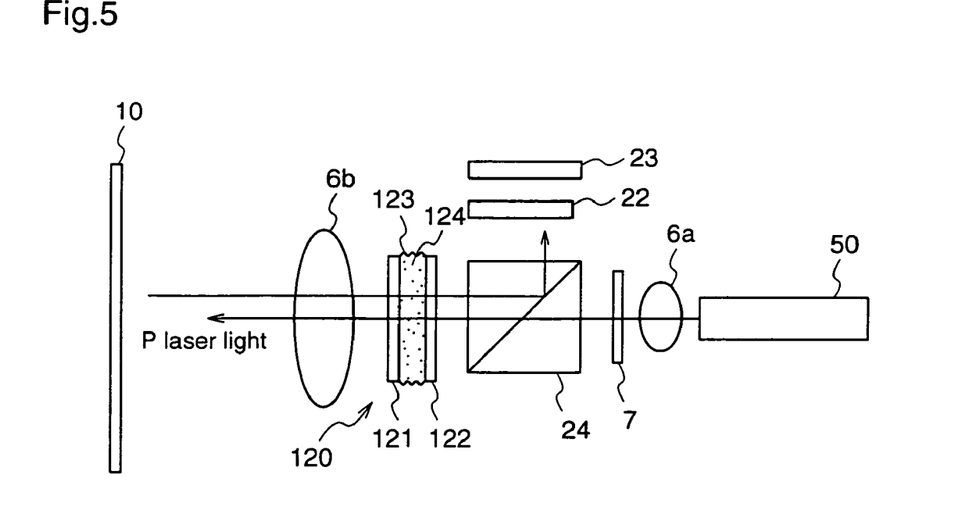
FIG. 5 is a schematic diagram for explaining principles of the video projector according to the second embodiment.

Next, the scheme of the camera shake correction of the video projector 102 according to the second embodiment will be described, with reference to FIG. 5. In FIG. 5, the same components as those in FIG. 4 are denoted by the same reference numerals.

In this second embodiment, the camera shake correcting optical system 120 comprises two glass plates 121 and 122, bellows 123 made of a special film, which is attached to the glass plates so that a space between the two glass plates is sealed, and a high refractive index liquid 124 having a high transparency, which is filled in the sealed space between the both glass plates, and this optical system has substantially the same function as a prism that has a variable vertical angle.

Figure 7A:
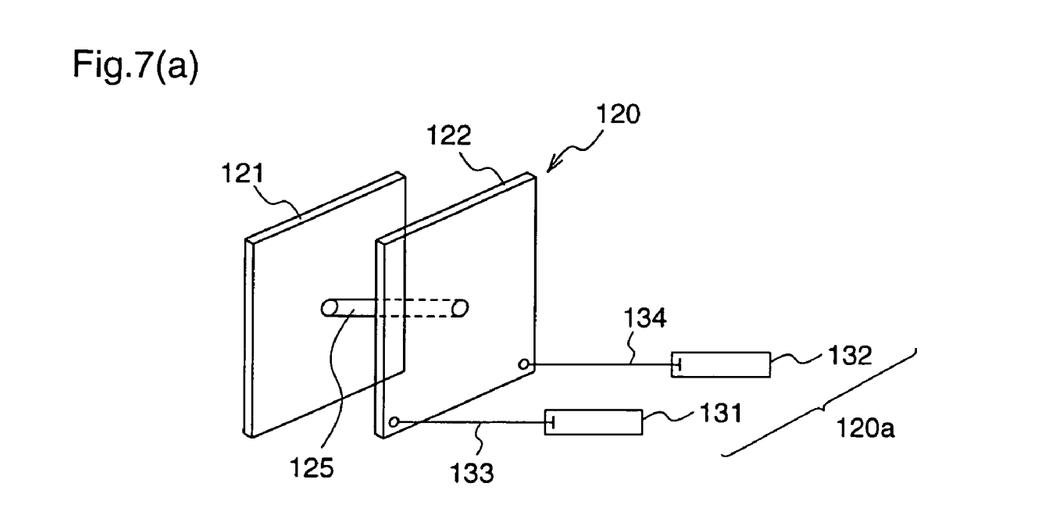
FIGS. 7(a) and 7(b) are diagrams showing three specific examples of the camera shake correcting optical system according to the second embodiment.

FIG. 7(a) is a diagram for explaining the camera shake correcting optical system 120 and its driving mechanism 120a.

The two glass plates 121 and 122 constituting the camera shake correcting optical system 120 are supported by a deformable supporting member 125. That is, one end of the supporting member 125 is fixed to a central part of one of the glass plates, i.e., the glass plate 121, and the other end of the supporting member 125 is fixed to a central part of the other glass plate 122. Here, as the supporting member 125, one having a refractive index which is substantially equal to that of the high refractive index liquid is employed.

One of the glass plates, 121, is fixed to the device body, and one ends of coupling rods 133 and 134 leading to actuators 131 and 132 are rotatably attached to both corner portions at the lower part of the other glass plate 122. The actuators 131 and 132 and the coupling rods 133 and 134 comprise the driving mechanism 120a for driving the camera shake correcting optical system 120.

Next, the operation and effect will be described.

The basic operation for projecting video of the video projector according to the second embodiment is the same as that of the first embodiment, and hereinafter, camera shake detection, camera shake correction, and capturing using a shutter will be mainly described.

Initially, the camera shake detection will be described.

In this second embodiment, the detection of the camera shake is performed on the basis of an output from the camera device 60 by the camera shake detecting mechanism 80. That is, the camera shake detection is performed by obtaining an amount of the camera shake from movement of video images at the four corner portions of the frame captured by the camera device 60. Then, an optimum correction value for an angle which is formed by the two glass plates of the camera shake correcting optical member is calculated from the detected camera shake amount, and the angle which is formed by the two glass plates is controlled by the electromagnetic actuators 131 and 132 on the basis of the calculated correction value, thereby correcting deviation of the optical axis. Since this method enables to correct the camera shake up to a camera shake frequency of about several tens Hz, it is possible to provide an inexpensive, compact, and lightweight video projector.

Here, while the descriptions are given of a case where the camera shake is detected from movement of video images at the four corner portions of the frame captured by the camera device, the method of detecting images which are used for the camera shake detection is not limited to this, but other image detection system is also effective.

Next, the camera shake correction using the camera shake correcting optical system 120 will be described in detail, with reference to FIG. 6.

Figure 6A:
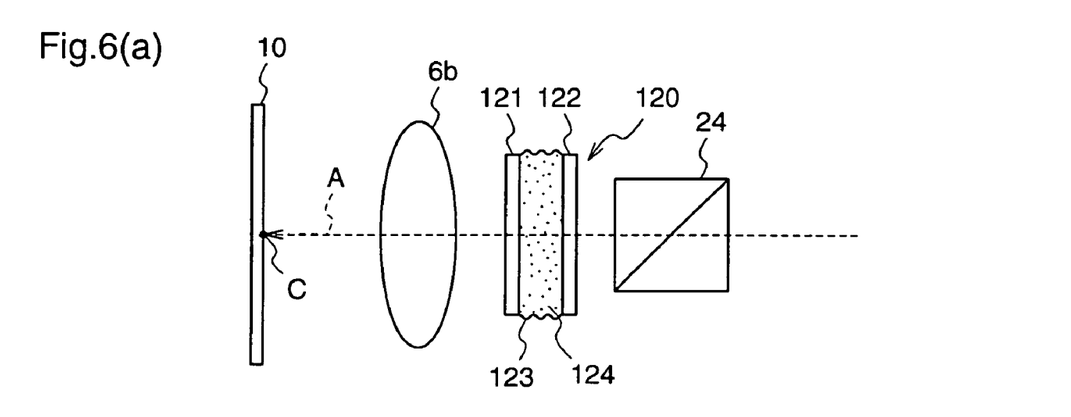

FIG. 6(*a*) shows a state where the optical axis A of the laser projection unit 50 of the video projector 102 is aligned with the center C of the screen 10.

Figure 6B:
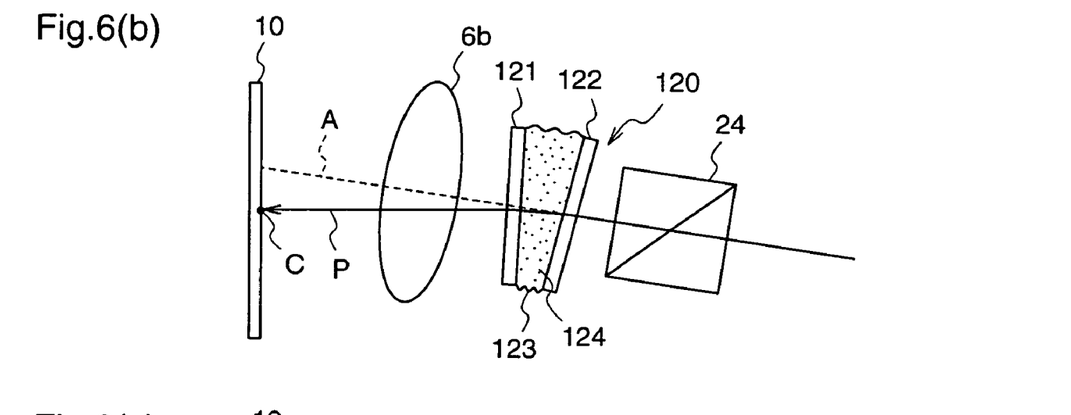

When the optical axis A of the laser projection unit 50 of the video projector 102 is deviated upward with respect to the center of the screen 10 due to the camera shake as shown in FIG. 6(*b*), the angle which is formed by the two glass plates comprising the camera shake correcting optical system 120 is changed so that the distance between the lower ends becomes narrower than the distance between the upper ends. Accordingly, the laser lights P from the laser projection unit 50 is refracted by the camera shake correcting optical system 120, thereby it is possible to correct deviation of the video projecting position, i.e., deviation of the center of the projected image from the center C of the screen 10.

Figure 6C:
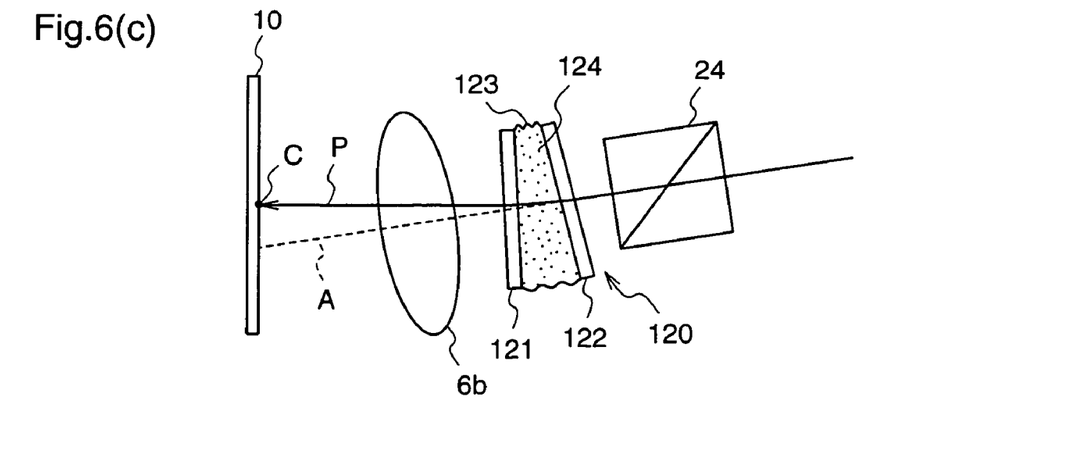

When the optical axis A of the laser projection unit 50 of the video projector 102 is deviated downward with respect to the center C of the screen 10 due to the camera shake as shown in FIG. 6(*c*), the angle which is formed by the two glass plates comprising the camera shake correcting optical system 120 is changed so that the distance between the upper ends becomes narrower than the distance between the lower ends. Accordingly, the laser light P from the laser projection unit 50 is refracted by the camera shake correcting optical system 120, thereby it is possible to correct deviation of the video projecting position due to the camera shake.

When the horizontal camera shake occurs, the camera shake correcting optical system 120 changes the angle which is formed by the two glass plates so that the deviation of the video projecting position is corrected by refraction of the laser light P from the laser projection unit 50, like in the case where the vertical camera shake occurs.

In this second embodiment, while the camera shake correcting optical system 120 has a structure in which the centers of the two glass plates are supported by the deformable supporting members, the camera shake correcting optical system may be of any type as long as it refracts light emitted from the laser projection unit so as to absorb deviation of the projecting position due to the camera shake.

Figure 7B:
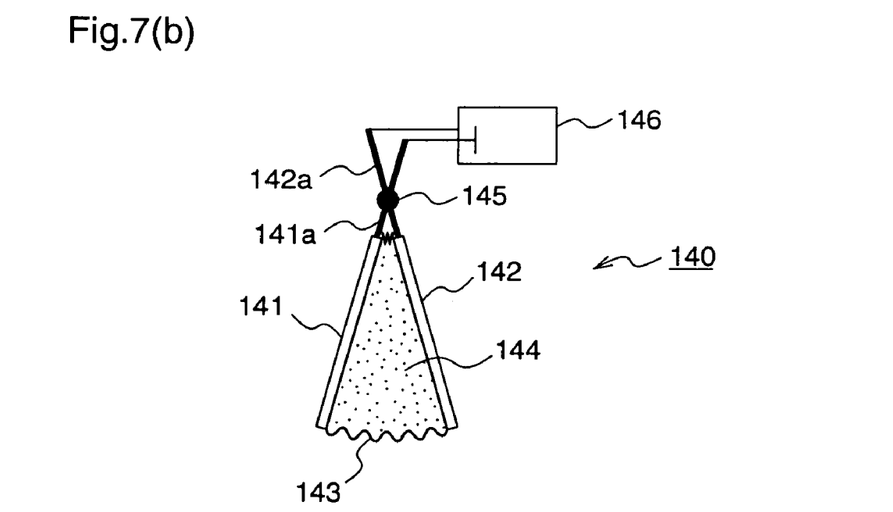

For example, as shown in FIG. 7(*b*), the camera shake correcting optical system may be a vertical angle variable prism 140 which is composed of opposed two glass plates 141 and 142, a supporting rod 141*a* that supports one of the glass plates, 141, a supporting rod 142*a* that supports the other glass plate 142, a bellows 143 made of a special film, which is attached to the glass plates so that a space between these glass plates is sealed, a high refractive index liquid 144 having a high transparency, which is filled in the sealed space between the glass plates, and a supporting member 145 that rotatably supports these supporting rods.

Here, as a mechanism for changing an angle that is formed by the glass plates, one actuator 146 that drives the supporting rods 141*a* and 142*a* for the glass plates may be employed.

The video projector 102 according to the second embodiment further has an auto-focusing function of automatically focusing the projecting optical system on the screen, and this auto-focusing function will be described next.

The auto-focusing of the lens of the projecting optical system is performed by employing a video detection system of internal focus. The basic principles of this detection system utilize a fact that high frequency components are increased when a camera is focused. Since this method can be realized at light weight and low cost, its industrial value is high. There are other detection methods, for example, an infrared ray method which performs focusing by emitting infrared rays and detecting the distance from an incident angle of the infrared rays which are reflected by the object, an ultrasonic wave method which performs focusing by emitting ultrasonic waves and detecting the distance from a response time that is obtained from emitting the ultrasonic waves to the ultrasonic wave returning after hitting the object, and a phase difference detection method which performs focusing by converting the contrast of video captured by the CCD 23 into an electric signal and analyzing its waveform.

Next, the operation of the shutter 22 will be described.

The shutter 22 is operated to switch which of the projection function and the camera function of the video projector 102 is to be used with priority by changing its open/close timing.

When priority is given with the camera function, the shutter is closed in conformity with the timing when laser lights are emitted from the laser light sources, and the shutter is opened in conformity with the timing when no laser lights are emitted from the laser light sources. Thereby, it is possible to capture only the image that is originally located in such a state where video is being projected onto the screen 10 so as to be superimposed on an image that is originally located.

When priority is given with the projection function, the shutter is opened in conformity with the timing when laser lights are emitted from the laser light sources, and the shutter is closed in conformity with the timing when no laser light is emitted from the laser light sources. Thereby, it is possible to detect the projected video with being highlighted even in a bright room, thereby effectively performing the camera shake correction on the basis of the detected video.

In this second embodiment, since the camera shake detection is performed using a video image that is captured by the camera device, no equipment which detects the camera shake such as a vibration gyro is required.

Further, in this second embodiment, since the prism 24, which refracts light from the screen to be headed to the CCD 23 of the camera device, is disposed on the optical path of the optical system for projecting laser lights onto the screen, and further the shutter 22 is disposed in front of the CCD 23, it is possible to perform the projection and the capturing simultaneously, or switching by giving priority to one of the projection and the capturing with changing the open/close timing of the shutter. Thus, it is believed that uses of the video projector are expanded and a new world such as games is opened.

In this second embodiment, by employing the video projector performing trapezoid correction of the projected video, it is possible to more correctly detect the projecting position of the camera device.

In this second embodiment, while the case where the camera shake detection is performed on the basis of movement of the video image captured by the camera device 60 is shown, the camera shake detection may be performed by using an image that has captured a portion as a remarque on a projection region such as the screen, by the camera device.

For example, when the screen 10 has a remarque such as a mark with good contrast, detection of the projecting position can be easily performed by the camera device. In this case, since there is no detection error and it is especially effective in auto-focusing, it is possible to capture clear images immediately after the projection. Here, the mark is one that has a contrast serving as a remarque on the projection region, and it is not necessary to be one that is previously formed on the screen, but anything such as scratch, dust, and stain on the projection region serving as the screen may be employed.

In this embodiment, while a description is given of a case where the projected images are moving pictures, the projected images may be still pictures.

Embodiment 3

A schematic block diagram illustrating a video projector according to a third embodiment of the present invention is shown in FIG. 8. In FIG. 8, the same components are those in FIG. 1 are denoted by the same reference numerals.

A video projector 103 according to the third embodiment has a basic structure that is the same as that of the first embodiment, but includes a mirror 26 in place of the prism 24 in the first embodiment. The mirror 26 is movably located between a position on the optical path and a position other than the optical path, between the camera shake correcting optical system 110 and the liquid crystal cell 7, and when the mirror is located on the optical path, it reflects light from the screen to head the light to the CCD 23. That is, the mirror 26 performs switching between projection and capturing.

Next, switching between projection and capturing will be described.

Figure 8A:
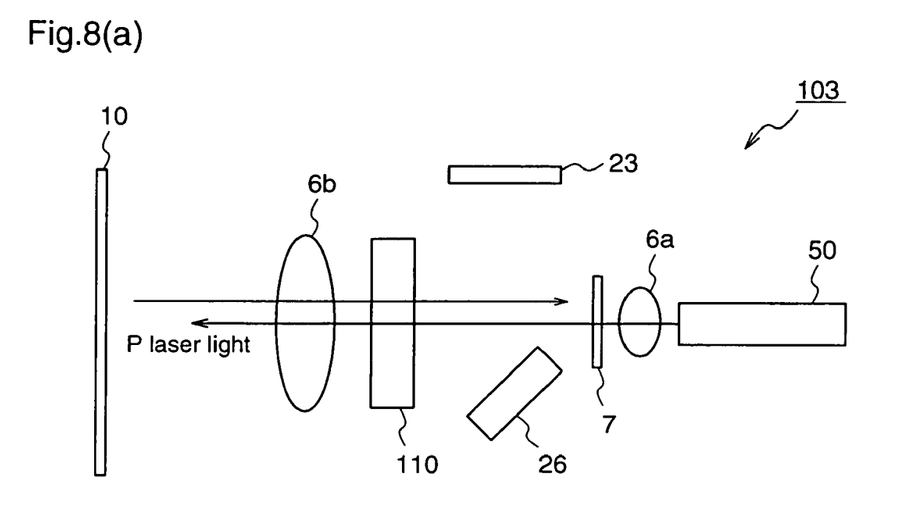

When video images are projected, the mirror 26 is evacuated between the camera shake correcting optical system 110 and the liquid crystal cell 7 as shown in FIG. 8(a). In this case, the laser light from the laser projection unit 50 is modulated by the liquid crystal cell 7, and projected on the screen 10 through the camera shake correcting optical system 110 and the projection lens 6b. Thereby, video images are formed on the screen.

Figure 8B:
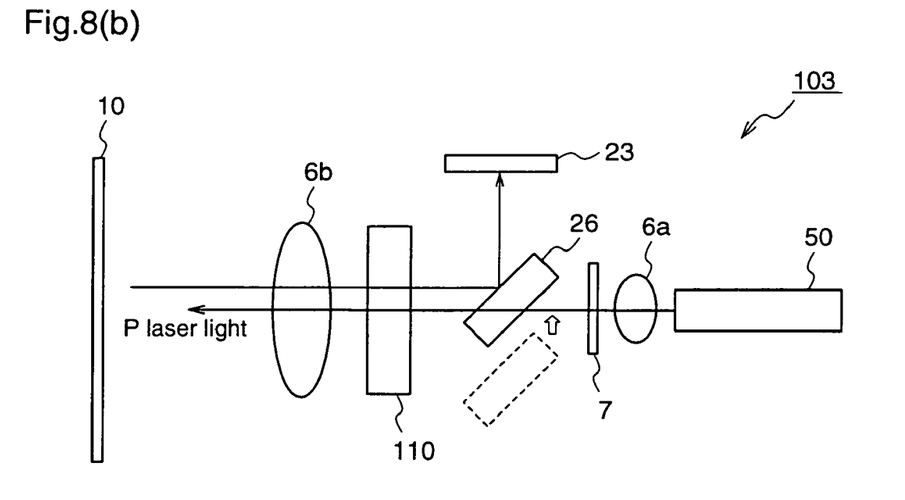

On the other hand, when the video images are captured, the mirror 26 is positioned on the optical path between the camera shake correcting optical system 110 and the liquid crystal cell 7 as shown in FIG. 8(b). Accordingly, it is possible to input 100% of the amount of light reflected from the screen 10, to the CCD 23, thereby enabling capturing in a dark place.

In this third embodiment, the camera shake correction is performed by the camera shake correcting optical system 110 that is positioned on the optical path of the laser light P, and the camera shake detection at this time is performed by the vibration gyro, like in the first embodiment.

In this third embodiment, since the video projector for projecting video includes the mirror 26 which is movably located between a position on the optical path of the laser light that is emitted from the laser projection unit and a position other than the optical path, and when it is disposed on the optical path, it reflects light from the screen to head the light to the CCD 23, and thereby it is possible to switch between projection and capturing by moving the mirror 26. For example, when the projection is performed, it is possible to project the light from the laser projection unit 50 directly onto the screen. When the capturing is performed, it is possible to bring 100% of light from outside the video projector to the CCD 23 by means of the mirror 26, thereby preventing the loss in the amount of light, and further enabling capturing in the dark place.

Embodiment 4

Figure 9:
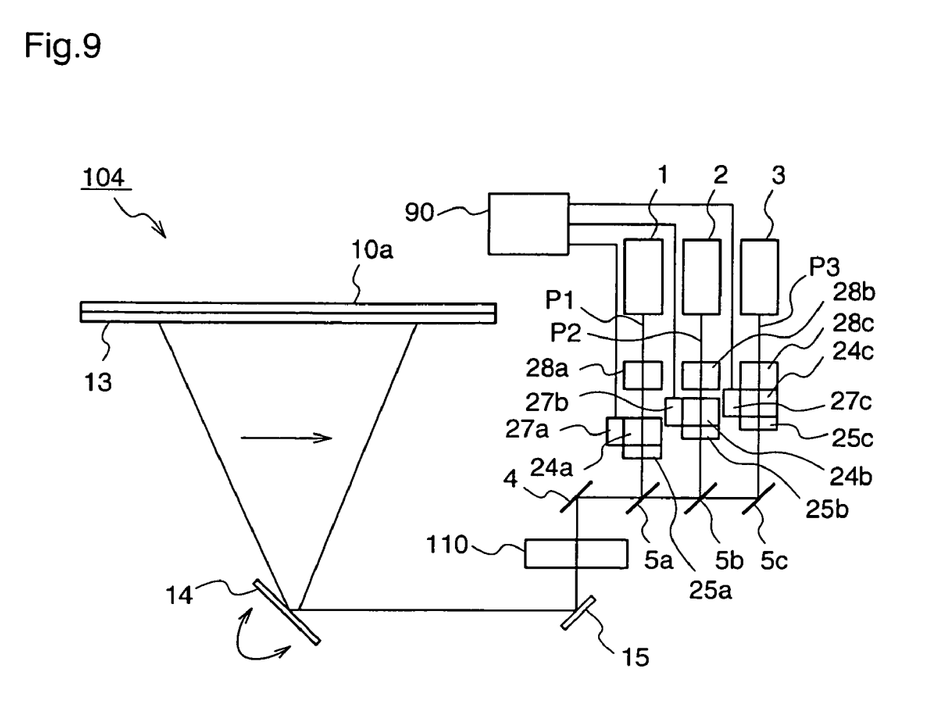
FIG. 9 is an entire block diagram illustrating a video projector according to a fourth embodiment of the present invention.

A block diagram illustrating a video projector according to a fourth embodiment of the present invention is shown in FIG. 9.

A video projector 104 according to the fourth embodiment has linear-polarized lasers 1, 2 and 3, as three-color (red, blue and green) short-wavelength laser light sources, and a screen 10a onto which video is projected reflects three-color (red, blue and green) laser lights P1, P2 and P3 that are emitted from the lasers. This screen 10a is obtained by attaching an absorber film 13 to the front face of a light incident surface.

The video projector 104 further has mirrors 5a, 5b, 5c and 4, camera shake correcting optical system 110, a horizontal deflection unit 15, and a vertical deflection unit 14.

The video projector 104 further includes prisms 24a, 24b and 24c, wavelength filters 25a, 25b and 25c, photodetectors 27a, 27b and 27c, and modulators 28a, 28b and 28c.

The horizontal deflection unit 15 deflects the laser lights so that the laser lights horizontally scan the screen 10a, and the vertical deflection unit 14 deflects the laser lights so that the laser lights vertically scan the screen 10a. The camera shake correcting optical system 110 is identical to the camera shake correcting optical system in the first embodiment, and is translated by an actuator vertically and horizontally in a plane that is perpendicular to the optical axis of the laser light from the mirror 4 so that deviation of the video projecting position due to the camera shake is corrected.

The modulators 28a, 28b and 28c modulate the strength of the laser lights from the short-wavelength laser light source 1, 2 and 3, respectively. The prisms 24a, 24b and 24c are located on the light emitting side of the corresponding modulators 28a, 28b and 28c, have respective polarization, and make 100% of the linear-polarized laser lights from the laser light sources pass through. The wavelength filters 25a, 25b and 25c are attached to the prisms 24a, 24b and 24c, and the wavelength filter 25a transmits only the red laser light, the wavelength filter 25b transmits only the blue laser light, and the wavelength filter 25c transmits only the green laser light. The photodetectors 27a, 27b and 27c detect external lights that are branched by the prisms 24a, 24b and 24c.

The video projector 104 further has an image formation unit 90 which forms an image that has captured the projection region on the basis of outputs from the respective photodetectors.

Next, the operation will be described.

The laser lights P1 to P3 which are emitted from the lasers 1 to 3 are intensity-modulated by the modulators 28a, 28b and 28c, and enter the mirror 5a, 5b and 5c through the prisms 24a, 24b and 24c and the wavelength filters 25a, 25b and 25c, respectively. The laser lights P1, P2 and P3 which are emitted from the lasers 1, 2 and 3 are reflected by these mirrors so that the respective optical axe are aligned, further reflected by the mirror 4, and enter the horizontal deflection unit 15 and the vertical deflection unit 14 through the camera shake correcting optical system 110.

In the vertical deflection unit 14, the laser light is deflected so as to vertically scan the screen 10a, and in the horizontal deflection unit 15, the laser light is deflected so as to horizontally scan the screen 10a. Thereby, the projected video images are formed on the screen 10a.

The laser light that scans the screen 10a through the horizontal deflection unit 15 and the vertical deflection unit 14 is reflected on the screen 10a, and the reflected laser light is branched by the prisms 24a, 24b and 24c, and detected by the photodetectors 27a, 27b and 27c.

That is, the laser lights reflected on the screen 10a return to the wavelength filter through the horizontal deflection unit 15, the vertical deflection unit 14, the camera shake correcting optical system 110 and the mirrors 4, 5a, 5b and 5c, and the red, blue and green light that have passed through the wavelength filters 25a, 25b and 25c, respectively, are reflected by the prisms 24a, 24b and 24c to be headed to the photodetectors 27a, 27b and 27c.

Then, in the video projector 104, the image formation unit 90 forms an image that has captured a projection region, on the basis of respective outputs from the photodetectors. Accordingly, it is possible to observe or record the image of the projection region.

Further, the camera shake correction is performed by moving the camera shake correcting optical system 110 according to the detected the camera shake amount so that the optical axis of the laser light which is reflected by the mirror 4 changes vertically and horizontally with respect to the screen, as in the first embodiment.

The camera shake detection is performed by using two vibration gyros, like in the first embodiment.

In this fourth embodiment, due to having constructed a video projector of a scanning system, no two-dimensional image device such as a liquid crystal cell is required, being advantageous in miniaturization and light-weighting. While the influences by the camera shake becomes particularly notable when the video projector is miniaturized, such camera shakes can be eliminated by providing the camera shake correcting optical system 110 as in this embodiment. Thereby, it becomes possible to project video without camera shakes, resulting in a large effect by the miniaturization.

In this fourth embodiment, a description is given of a case where the video is projected employing a scanning system with using the vertical deflection unit 14 and the horizontal deflection unit 15. However, when a MEMS that has integrated these units is employed, more compact video projector can be realized.

Further, while three primary color lasers are employed as the short-wavelength laser light sources in this fourth embodiment, it is also possible to employ two lasers, i.e., a laser with the wavelength of 450 nm and a laser with the wavelength of 480 nm for blue lasers, i.e., to employ four wavelength lasers as a total. Further, the number of wavelengths of laser lights employed for light sources may be larger or smaller than this number. For example, it is also possible to constitute a single color video projector which employs only one short-wavelength laser light source.

In the respective embodiments, while the semiconductor lasers are employed as the light sources of the video projector, light-emitting diodes (LED) may be employed as the light sources.

In addition, in the fourth embodiment, while the camera shake detection is performed by using two vibration gyros as in the first embodiment, the camera shake detection may be performed on the basis of an image that is formed by the image formation unit 90, i.e., an image that has captured a projected video on the screen. In this case, a mechanism for detecting the camera shake such as the vibration gyro can be dispensed with.

In the fourth embodiment, it is preferable that the projecting position should be detected by capturing a region other than coverage where the laser lights are projected. The reason is as follows. Since a screen as the laser light projection region is usually white, detection of the projecting position by the camera device may be difficult. Therefore, it is possible to easily detect the projecting position by using a previously created mark, or a portion having good contrast such as a scratch or dust that is originally located in this region, serving as a remarque, as a reference for the position detection, in an region outside the projection coverage.

Hereinafter, a video projector that utilizes a mark in a region outside the projection coverage of the laser lights as a reference for the position detection will be briefly described, with reference to FIG. 10.

Figure 10:
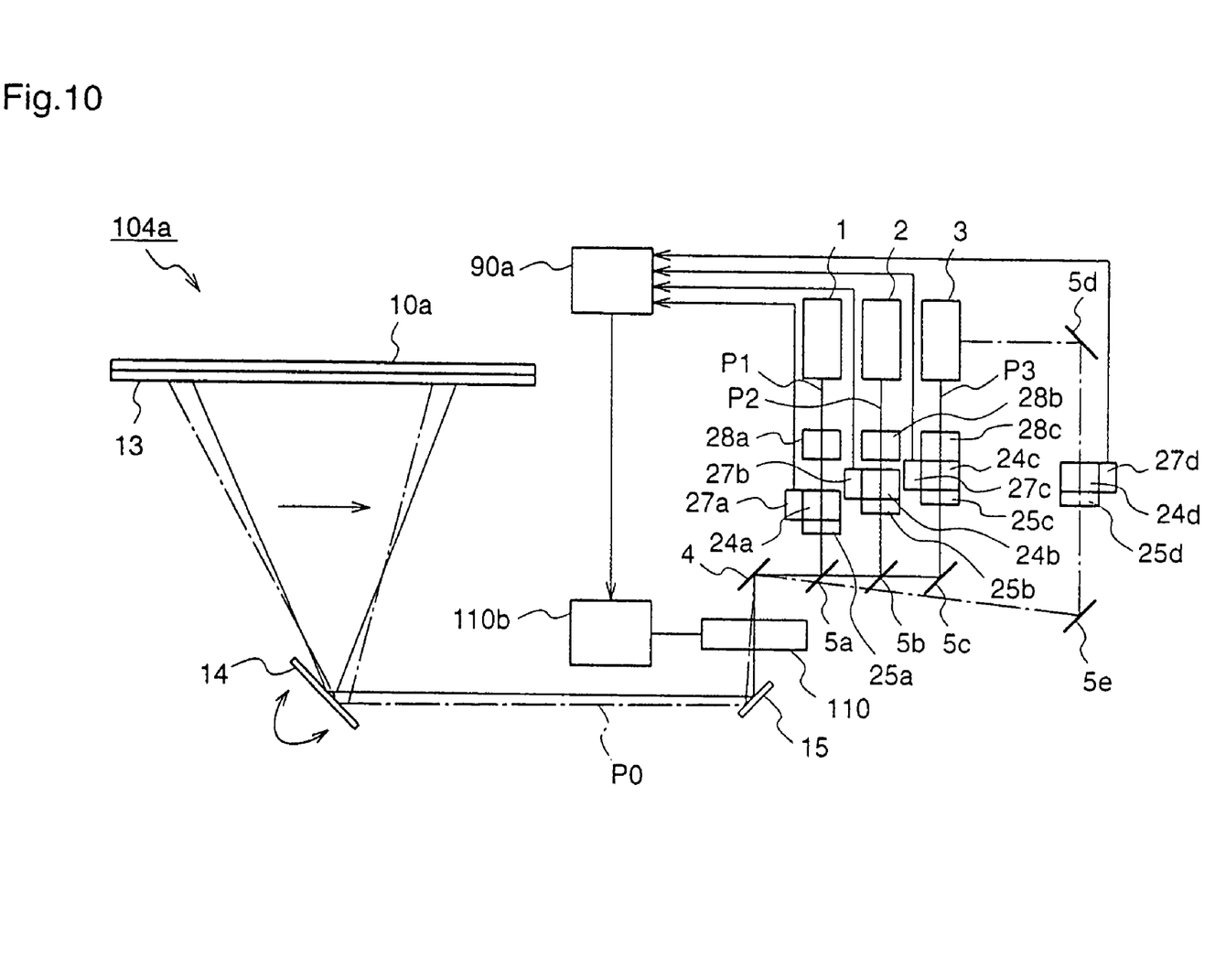
FIG. 10 is an entire block diagram illustrating another example of the video projector according to the fourth embodiment.

In FIG. 10, reference numeral 104a denotes a video projector that utilizes a mark in a region outside the projection coverage of the laser lights as a reference for the position detection, and the video projector 104a comprises lasers 1 to 3, mirror 4 and 5a-5c, a camera shake correcting optical system 110, a horizontal deflection unit 15, a vertical deflection unit 14, prisms 24a~24c, wavelength filters 25a~25c, photodetectors 27a~27c, and modulators 28a~28c, like the video projector 104 according to the fourth embodiment.

The video projector 104a further comprises mirrors 5d and 5e, a wavelength filter 25d, a photodetector 27d, and a prism 24d.

The mirrors 5d and 5e reflect infrared laser lights P0 that have not been wavelength-converted among the infrared laser lights from the green laser 3, to be headed to the mirror 4 so that its optical axis is slightly deviated from that of the laser lights P1 to P3. The wavelength filter 25d transmits only the infrared laser light P0 that is reflected by the screen 10a, the prism 24d reflects only reflected light of the infrared laser light P0 that is transmitted through the wavelength filter 25d, to be headed to the photodetector 27d, and the photodetector 27d detects the reflected light of the infrared laser light P0.

This video projector 104a further comprises an image forming unit 90a which forms an image that has captured a projection region on the basis of outputs from the photodetectors 27a~27c, as well as forms a projecting position detecting image that has captured the projection region on the basis of an output from the photodetector 27d, to detect a projecting position, and an optical system driving mechanism 110b that drives the camera shake correcting optical system 110 on the basis of the projecting position like in the first embodiment.

In this video projector 104a, the infrared laser light P0 scans an region that is slightly deviated from the three-color laser lights P1 to P3, and thus the image formation unit 90a forms an image of a previously created mark near the projection coverage, or a portion such as a scratch or a dust that has good contrast and serves as a remarque, which is originally located in this region.

Then, the image formation unit 90a detects the projecting position on the basis of the image of this portion serving as a remarque, and outputs the amount of camera shake to the optical system driving mechanism 110b.

Thereafter, the optical system driving mechanism 110b translates the camera shake correcting optical system 110 vertically and horizontally in a plane that is perpendicular to the optical axis of the laser lights P1 to P3 reflected by the mirror 4, so that deviation of the projecting position of the video due to the camera shake is corrected according to the amount of the camera shake.

The video projector of the present invention changes the light emitting direction of the projecting optical system according to the camera shake, by the optical correction method, to quickly correct the camera shake, and accordingly this is innovative enough to perform the video projection with being held in hands, and useful in realizing a compact portable video projector or a mobile phone that can perform video projection.

The invention claimed is:

1. A portable video projector for projecting video, comprising:
   a projection optical system which projects video by short-wavelength laser light sources which emit laser lights as linear polarized lights of at least three colors including red, blue and green;
   a camera device which captures external light through said projection optical system;
   a camera shake detection unit which detects an amount of camera shake of the portable video projector while being held by a user; and
   a camera shake correction unit which corrects the camera shake according to the amount of camera shake detected by said camera shake detection unit,
   wherein said projection optical system projects the three-color laser lights without losses in their light amounts using prisms performing polarization, which are arranged such that respective axes thereof coincide with the polarizations of the three-color laser lights, and a part of the captured external light is incident on said camera device by the prisms performing polarization, and
   wherein said camera shake correction unit performs correction of the camera shake so that projecting positions of the laser lights of three colors including red, blue and green are not deviated when the video is projected, and said camera shake detection unit detects the camera shake amount by detecting movement of a video at four corners of an image that is captured by said camera device.

2. The portable video projector as defined in claim 1, wherein said camera shake correction unit includes:
   two glass plates supported by support members,
   a special film which is attached to the two glass plates so that a space between the two glass plates is sealed, and
   a high refractive index liquid having a high transparency, which is filled in the sealed space between the two glass plates.

3. The portable video projector as defined in claim 2, wherein
   a first glass plate of the two glass plates, which is positioned on a projection surface side, is fixed by a first support member of the support members so as to be parallel to a projection surface, and
   a second glass plate of the two glass plates is rotatable due to a second support member of the support members attached to the second glass plate being connected to an actuator.

4. The portable video projector as defined in claim 2, wherein
   said camera shake correction unit calculates an appropriate correction value of an angle formed between the two glass plates on the basis of the camera shake amount detected by said camera shake detection unit, and performs correction on the basis of a calculated correction value.

5. The portable video projector as defined in claim 1, wherein
   infrared laser light is irradiated to a region outside a projection region, and the infrared laser light from the region outside the projection region is detected by said camera device.

* * * * *